(12) United States Patent
Staffel et al.

(10) Patent No.: US 6,352,587 B1
(45) Date of Patent: Mar. 5, 2002

(54) USE OF A COLORANT SOLUTION CONTAINING A STABLE, AT LEAST PARTIALLY NEUTRALIZED CHROMIUM (III) COORDINATION COMPOUND FOR COLORING UNGLAZED CERAMIC

(75) Inventors: Thomas Staffel, Grünstadt; Jürgen Straub, Mannheim; Thomas Klein, Heidelberg, all of (DE)

(73) Assignee: BK Giulini Chemie GmbH & Co. OHG, Ludwigshafen (DE)

( * ) Notice: Subject to any disclaimer, the term of this patent is extended or adjusted under 35 U.S.C. 154(b) by 0 days.

(21) Appl. No.: 09/323,140

(22) Filed: Jun. 1, 1999

(51) Int. Cl.$^7$ .................................................. C09C 1/34
(52) U.S. Cl. .......................................... 106/453; 106/34
(58) Field of Search .................................... 106/453, 34

(56) References Cited

U.S. PATENT DOCUMENTS

| 3,787,326 A | 1/1974 | Deyrup | 260/438.5 |
| 3,900,689 A | 8/1975 | Deyrup | 428/432 |
| 6,099,633 A * | 8/2000 | Vignali | 106/287 |

FOREIGN PATENT DOCUMENTS

| DE | 2 116 299 | 10/1971 |

OTHER PUBLICATIONS

Ivchanko et al., Derwent Abstract XP–002114683, SU 1 728 207, Apr. 23, 1992.
Bendelev, et al., Derwent Abstract XP–002114684, SU 1 768 565 A, Oct. 15, 1992.

* cited by examiner

Primary Examiner—Elizabeth D. Wood
(74) Attorney, Agent, or Firm—Venable; George H. Spencer; Ashley J. Wells

(57) ABSTRACT

A process for coloring an unglazed ceramic with an aqueous colorant solution containing a chromium (III) coordination compound which is at least partially neutralized and stable, including (a) dissolving a carboxylic acid selected from the group consisting of acetic acid, an organic dicarboxylic acid having a general formula (COOH)—(CH$_2$)$_n$—(COOH), where n ranges from 0 to 10, and an unsaturated, organic dicarboxylic acid in water at a temperature ranging from 40 to 60° C. to provide an aqueous solution of a carboxylic acid; (b) adding a chromium (III) compound to the aqueous solution of a carboxylic acid while stirring for a time and at a temperature effective for reaction to form an aqueous solution containing a chromium (III) coordination compound; (c) filtering the aqueous solution containing the chromium (III) coordination compound to provide a filtered aqueous solution; and (d) adjusting pH of the filtered aqueous solution to a pH ranging from 3 to 6.5 by addition of one of alkali hydroxide or ammonia to provide the aqueous colorant solution containing a chromium (III) coordination compound which is at least partially neutralized, which is stable, and which has a chromium content ranging from 5 to 10% by weight.

16 Claims, No Drawings

USE OF A COLORANT SOLUTION CONTAINING A STABLE, AT LEAST PARTIALLY NEUTRALIZED CHROMIUM (III) COORDINATION COMPOUND FOR COLORING UNGLAZED CERAMIC

BACKGROUND OF THE INVENTION

1. Field of the Invention

The present invention relates to the use of stable chromium(III) compounds, particularly in the form of colorant solutions, which are used for colouring ceramics.

2. Description of the Related Art

In the ceramics industry, unglazed ceramics have hitherto been coloured and decorated using, inter alia, compounds of the transition metals, e.g. of chromium, cobalt, iron, manganese, nickel, gold, etc., in the form of their water-soluble salts (chlorides, acetates, nitrates or sulphates), as described, for example, in DE-A 21 17 449.

These compounds were selected because they are stable to hydrolysis and oxidation in aqueous solution.

Aqueous chromium compounds having the oxidation state VI, e.g. potassium dichromates, were, in particular, preferably used because they are nitrate- and sulphate-free and thus form no corrosive gases during the firing of the ceramics and, in addition, have a high metal ion concentration in the aqueous solution and are also stable and compatible in mixtures with other metal compounds.

However, apart from the chemical stability, it is just as important that when these compounds are used as ceramic colorant solutions they have the properties desired there. A very important property which these colorant solutions have to have is an ability to penetrate sufficiently deeply into the unglazed ceramic surface. Only in this way is it ensured that the colour produced can develop or form to a sufficient intensity after firing. The penetration depth also has to be sufficiently great, in particular, because the surface of the ceramic piece is subjected to further mechanical treatment, in particular grinding, after firing. Here, a few tenths of a millimeter are taken off the coloured surface material. The ceramic article thus loses its intense colour if the penetration depth was not sufficiently great.

Naturally, the colour intensity also depends on the concentration of the colorant solutions applied. For the present purposes, concentration means the concentration of colour-imparting metal cations. It is clear that the higher this concentration, the more intense the colour which the compound can produce. However, for physicochemical reasons, it is not possible to increase the concentration at will, because otherwise the stability of the solution is no longer ensured. A metal salt solution is referred to as stable if it displays no precipitation or flocculation even at a relatively high ion concentration. An important stability factor is the pH of the solution. It is known that such compounds are always stable only in a particular pH range.

Further requirements which these compounds have to meet are determined by occupational health and safety aspects. The use of these compounds should be as safe as possible without complicated protective measures having to be taken during their use.

However, those skilled in the art know that the use of some of these metal salt solutions is problematical in terms of human health. In these cases, lawmakers have stipulated either particular occupational health and safety measures or the complete replacement of these compounds by others which produce equivalent results. In the case of chromium (VI) compounds, lawmakers have decided that these compounds have to be replaced as from 1998, since the chromium(VI) compounds customarily used are known to be very toxic when swallowed or inhaled; they irritate the mucous membranes and particularly the eyes if they are used in the form of an aerosol and finally they are carcinogenic according to the German Federal Health Department classification. All these properties naturally hinder continued use, or it is ruled out automatically.

It is therefore an object of the invention to find suitable chromium compounds which have the same properties as the chromium(VI) compounds for the required application but do not have the adverse properties indicated above.

SUMMARY OF THE INVENTION

This object could surprisingly be achieved by the use of neutralized or partially neutralized chromium(III) coordination compound (complex compound) which are a constituent of ceramic colorant solutions and are obtainable by reacting a chromium(III) compound with an organic dicarboxylic acid of the general formula $(COOH)-(CH_2)_n-(COOH)$, where the index n is from 0 to 10, or an unsaturated, organic dicarboxylic acid, in particular maleic acid and fumaric acid, by treating the chromium(III) compound with the aqueous solution of the carboxylic acid at temperatures between [sic] 40 to 60° C., preferably at 55° C., while stirring and, after filtration, adjusting the pH of the solution to from 5.5 to 6.5 using alkali, preferably using concentrated ammonia, where the chromium(III) coordination (complex) compound solution has a chromium content of from 5 to 10% by weight, preferably a chromium content of from 5 to 7% by weight.

DESCRIPTION OF THE PREFERRED EMBODIMENTS

As organic, saturated dicarboxylic acid, use is made, in particular, of oxalic acid in its commercial form. As unsaturated, organic dicarboxylic acid, preference is given to using maleic acid. The chromium(III) coordination compounds prepared in this way can be used alone or in mixtures with colorant solutions containing coloured metal salts for colouring ceramic surfaces.

The compounds according to the invention, e.g. the chromium(III) oxalate solution, has a Cr content of from 5 to 10% by weight, preferably a chromium content of from 5 to 7% by weight, and a pH of from 3 to 3.5. It was surprising to a person skilled in the art that these neutralized or partially neutralized chromium(III) compound have particularly advantageous properties in use, as will be demonstrated below.

The suitability of the chromium(III) compounds according to the invention as colorant solution for the production of decorated ceramic articles is assessed according to the following evaluation criteria:

1. The colour achieved
2. Penetration depth into the ceramic surface
3. Stability or the degree of demixing when mixtures are employed, and also the chemical and physical compatibility with other colour-imparting metal salts.

For the sake of clarity, the use-related results are shown in tabular form.

PREPARATIVE EXAMPLE 1

Distilled water was placed in a 150 ml glass beaker. While stirring, oxalic acid of the formula $(COOH)_2 \times 2H_2O$ was added and the mixture was then heated to 50–60° C.

Chromium(III) hydroxide was subsequently added a little at a time and the mixture was then stirred for about 30 minutes at 90–95° C. The reactants had then reacted completely. The mixture was subsequently cooled to 40° C. and filtered and the pH was then set to 6 using concentrated ammonia.

In Table 1, chromium(III) oxalate solutions having different concentrations are prepared.

TABLE 1

| Weight used, in g | 6% strength solution | 8% strength solution | 10% strength solution | 12% strength solution |
|---|---|---|---|---|
| Water | 66.2 | 54.9 | 43.7 | 32.5 |
| Chromium hydroxide | 13.9 | 18.5 | 23.1 | 27.7 |
| Oxalic acid | 19.9 | 26.6 | 33.2 | 39.8 |

These solutions were all stable, i.e. chromium hydroxide or other basic chromium salts did not precipitate subsequently from any of the solutions.

Examination of the Compatibility With Other Colour-imparting Complexes Which Are Present in the Colorant Solutions When using the colorant solutions, there are two different application methods:

To colour an unglazed ceramic surface, the colorant solution or a mixture of a plurality of colorant solutions is sprayed onto the surface by means of a suitable nozzle or is applied by the screen printing method using a frame and roller. The colorant solution has to penetrate into the surface of the ceramic body by capillary means to a certain pore depth. The colour intensity and the perceived colour or pattern depend firstly on the concentration of the solutions and secondly on the compatibility of the colour-imparting complexes with one another. If a mixture of different colour-imparting complexes is present, it is possible for, in particular, coagulation or decomposition of the complexes to occur. In the case of the mixture of cobalt(II) complexes, e.g. cobalt(II) citrate, which produce a blue colour when employed alone, with the chromium(III) complexes prepared according to the invention, no precipitation of components of the solution takes place. Rather, when the two complexes are mixed an intense green-blue colour is obtained on the ceramic surface after firing.

The good compatibility is determined essentially by the precisely settable pH which is from 3 to 3.5 in the case of the product prepared according to the invention.

Examination of the Penetration Depth of the Chromium(III) Compound According to the Invention at Various pH Values The colorant solutions prepared according to the invention also have a very good penetration depth into the ceramic surface. The results achieved here are shown in Table 2:

For this purpose, the following experiment was carried out using a ceramic tile which is especially suitable for this purpose (gres porcellanato type):

The unfired, light-coloured ceramic tile was sprayed with about 1.5 g of water. A drop of the colorant solution according to the invention was then applied to the tile and spread in one line using a brush. This was repeated 3 times, so that a total of 4 drops of colorant solution were applied. The ceramic tile was subsequently sprayed once more with 1.5 g of water and, after drying, fired at 1140° C. in a kiln.

It can clearly be seen here that the chromium(III) compound prepared according to the invention and neutralized using ammonia displays the best penetration behaviour.

TABLE 2

|  | Cr(VI) complex Prior art | Cr oxalate KOH | Cr oxalate NaOH | Cr oxalate $NH_3$ | Cr-ethylenediamine 1:1 | Cr-ethylenediamine 1:2 |
|---|---|---|---|---|---|---|
| Penetration depth | ca. 2.0 mm | ca. 1.0 mm | ca. 2.0 mm | ca. 2.5 mm | ca. 1.0 mm | ca. 1.0 mm |

Compounds used

Chromium(III) oxalate, 7% strength aqueous solution

Chromium(III) acetate, 7% strength aqueous solution

Aqueous sodium hydroxide solution, 50% Ammonia solution, 25%

Experimental Procedure

The chromium solutions (50 ml) are set to various pH values in the range from 2 to 6 using aqueous sodium hydroxide or ammonia. The solutions are then applied by means of a brush to an unfired, unglazed light-coloured tile. The lower half of the tile was subsequently treated with water. The tile was fired at temperatures of from 600 to 1400° C. in a suitable kiln, namely for about 360 minutes (6 hours) at 600° C. and for 60 minutes (1 hour) at 1400° C. The tile was then cut and the penetration depth of the colorant solution into the tile was evaluated.

TABLE 3

| Chromium acetate | pH | Penetration depth in mm |
|---|---|---|
| Original* | 2.35 | 1.5 |
| 0.2 g of ammonia | 3.5 | 1.5 |
| 0.15 g of NaOH | 3.5 | 1.5 |
| 2.4 g of ammonia | 6.0 | 1.0 |
| 2.4 g of NaOH | 6.0 | 1.0 |

*Original means that the chromium acetate was examined without neutralizing additions

TABLE 4

| Chromium oxalate | pH | Penetration depth in mm |
|---|---|---|
| Original* | 0 | 1.0 |
| 6.0 g of ammonia | 0 | 1.0 |
| 7.1 g of NaOH | 3.5 | 1.5 |
| 12 g of ammonia | 6.0 | 2.5 |
| 11.5 g of NaOH | 6.0 | 2.0 |

*Original means that the chromium oxalate was examined without neutralizing additions

Thin-layer Chromatograms of the Various Chromium(III) Complexes

The particular properties of the chromium(III) complexes prepared according to the invention are also shown in the study by thin-layer chromatography in comparison with compounds according to the prior art. The measure of mobility used is the $R_f$.

The $R_f$ is defined as the ratio of the distance from the start to the zone midpoint to the distance from the start to the eluant front.

$$R_f = \frac{\text{Distance from start to zone midpoint}}{\text{Distance from start to eluant front}}$$

The $R_f$ ranges from 0 to 1, with the value 0 corresponding to the starting point and the value 1 corresponding to the eluant front. The adsorbent used was a microcrystalline cellulose and the eluant used was pure, deionized water having a pH of 7. It can be concluded from the $R_f$ values measured that the chromium(III) oxalates according to the invention have a higher mobility in the eluant compared with the chromium(III) acetates. This The $R_f$ ranges from 0 to 1, with the value 0 corresponding to the starting point and the value 1 corresponding to the eluant front. The adsorbent used was a microcrystalline cellulose and the eluant used was pure, deionized water having a pH of 7. It can be concluded from the $R_f$ values measured that the chromium (III) oxalates according to the invention have a higher mobility in the eluant compared with the chromium(III) acetates. This in turn allows conclusions to be drawn as to the penetration behaviour of the chromium(III) oxalate solutions into a tile material, i.e. the higher the mobility expressed by the $R_f$ values, the better the penetration behaviour into the ceramic surface.

TABLE 5

| Description | Component | $R_f$ |
| --- | --- | --- |
| Chromium acetate according to the prior art | Chromium acetate | 0.3 |
| Chromium oxalate according to the invention | Chromium oxalate | 0.7 |

What is claimed is:

1. A process for coloring an unglazed ceramic with an aqueous colorant solution containing a chromium (III) coordination compound which is at least partially neutralized and stable, comprising:
    a. dissolving a carboxylic acid selected from the group consisting of:
        acetic acid, and
        an organic dicarboxylic acid having a general formula (COOH)—(CH$_2$)$_n$—(COOH), where n ranges from 0 to 10,
    in water at a temperature ranging from 40 to 60° C. to provide an aqueous solution of a carboxylic acid;
    b. adding a chromium (III) compound to the aqueous solution of a carboxylic acid while stirring for a time of up to about 30 minutes and at a temperature up to 95° C. effective for reaction to form an aqueous solution containing a chromium (III) coordination compound;
    c. filtering the aqueous solution containing the chromium (III) coordination compound to provide a filtered aqueous solution;
    d. adjusting pH of the filtered aqueous solution to a pH ranging from 3 to 6.5 by addition of one of alkali hydroxide or ammonia to provide the aqueous colorant solution containing a chromium (III) coordination compound which is at least partially neutralized, which is stable, and which has a chromium content ranging from 5 to 10% by weight; and applying the aqueous colorant solution to the unglazed ceramic to color the unglazed ceramic.

2. The process according to claim 1, wherein adding the chromium (III) compound to the aqueous solution of a carboxylic acid while stirring includes heating the aqueous solution containing the chromium (III) compound at a temperature ranging from 40 to 95° C. to react the carboxylic acid and the chromium (III) compound and form the chromium (III) coordination compound.

3. The process according to claim 2, wherein the aqueous solution containing the chromium (III) compound is heated at a temperature ranging from 90 to 95° C.

4. The process according to claim 2, wherein the carboxylic acid is dissolved in water at a temperature of 55° C.

5. A process for coloring an unglazed ceramic with an aqueous colorant solution containing a chromium (III) coordination compound which is at least partially neutralized and stable, comprising:
    a. dissolving a carboxylic acid selected from the group consisting of:
        acetic acid, and
        an organic dicarboxylic acid having a general formula (COOH)—(CH$_2$)$_n$—(COOH), where n ranges from 0 to 10,
    in water at a temperature ranging from 40 to 60° C. to provide an aqueous solution of a carboxylic acid;
    b. adding a chromium (III) compound which is a basic salt of chromium to the aqueous solution of a carboxylic acid while stirring for a time and at a temperature effective for reaction to form an aqueous solution containing a chromium (III) coordination compound;
    c. filtering the aqueous solution containing the chromium (III) coordination compound to provide a filtered aqueous solution;
    d. adjusting pH of the filtered aqueous solution to a pH ranging from 3 to 6.5 by addition of one of alkali hydroxide or ammonia to provide the aqueous colorant solution containing a chromium (III) coordination compound which is at least partially neutralized, which is stable, and which has a chromium content ranging from 5 to 10% by weight; and
    e. applying the aqueous colorant solution to the unglazed ceramic to color the unglazed ceramic.

6. The process according to claim 5, wherein the basic salt of chromium is chromium (III) hydroxide.

7. The process according to claim 1, wherein the carboxylic acid is acetic acid.

8. The process according to claim 7, wherein the alkali hydroxide is sodium hydroxide and the ammonia is concentrated ammonia.

9. The process according to claim 8, wherein the aqueous colorant solution has a chromium content ranging from 5 to 7% by weight after adjusting the pH thereof.

10. The process according to claim 1, wherein the carboxylic acid is an organic dicarboxylic acid having a general formula (COOH)—(CH$_2$)$_n$—(COOH), where n ranges from 0 to 10.

11. The process according to claim 10, wherein the organic dicarboxylic acid is oxalic acid.

12. The process according to claim 11, wherein the alkali hydroxide is sodium hydroxide and the ammonia is concentrated ammonia.

13. The process according to claim 12, wherein the aqueous colorant solution has a chromium content ranging from 5 to 7% by weight after adjusting the pH thereof.

14. The process according to claim 1, wherein the alkali hydroxide is sodium hydroxide an the ammonia is concentrated ammonia.

15. The process according to claim 1, wherein the pH ranges from 5.5 to 6.5.

16. The process according to claim 1, wherein the aqueous colorant solution has a chromium content ranging from 5 to 7% by weight after adjusting the pH thereof.

* * * * *